(12) United States Patent
Vossler

(10) Patent No.: US 6,614,450 B1
(45) Date of Patent: Sep. 2, 2003

(54) INFORMATION DISPLAY SYSTEM FOR SCHEDULING THE UTILIZATION OF A FACILITY

(75) Inventor: Stephen P. Vossler, Sioux Falls, SD (US)

(73) Assignee: Gateway, Inc., Poway, CA (US)

(*) Notice: Subject to any disclaimer, the term of this patent is extended or adjusted under 35 U.S.C. 154(b) by 0 days.

(21) Appl. No.: 09/261,659

(22) Filed: Mar. 3, 1999

(65) Prior Publication Data
(65)

(51) Int. Cl.$^7$ ................................................ G09G 5/00
(52) U.S. Cl. ........................ 345/751; 345/752; 345/963; 705/8
(58) Field of Search ................................ 345/700, 710, 345/733, 741, 742, 751, 752, 764, 963, 173; 705/8, 9

(56) References Cited

U.S. PATENT DOCUMENTS

| | | | | |
|---|---|---|---|---|
| 4,937,743 A | * | 6/1990 | Rassman et al. | 705/8 |
| 5,309,174 A | * | 5/1994 | Minkus | 345/204 |
| 5,493,692 A | * | 2/1996 | Theimer et al. | 455/26.1 |
| 5,815,554 A | * | 9/1998 | Burgess et al. | 379/90.01 |

OTHER PUBLICATIONS http://www.alarmparts.com/manu/Corby/system2_a.htm "Corby's System 2"Jun. 26, 1998, 3 pages.
http://www.on.com/prodinfo/mm/descript.htm "Meeting Maker®, Version 5.0.3" 3 pages, Jun. 26, 1998.
http://www.comnet-fids.com/airports.htm "Airports"Jun. 26, 1998, 1 page.
http://www.comnet-fids.com/led.htm "LCD Signs" Jun. 25, 1998, 2 pages.
Barbara Cook, "The Future Comes to Airport Signage" Jun. 26, 1998, 5 pages http://www.airportnet.org/depts/publicat/airmags/am91097/signage.htm.
http://www.comnet-fids.com/playout.htm "Products"Jun. 25, 1998, 2 pages.
http://www.tcs-basys.com "SZ1041" 2 pages, Jun. 26, 1998.
hrrp://www.flatpanels.com/dispstrt.html "DisplayStart / Single Board Computers" Jun. 26, 1998, 5 pages.

* cited by examiner

*Primary Examiner*—Sy D. Luu
(74) *Attorney, Agent, or Firm*—Scott Charles Richardson; Chad W. Swantz; Suiter-West

(57) ABSTRACT

An information display system is disclosed. The information display system includes a display connected to a controller and a network interface. The information display system is capable of changing the information processed by the system through a network interface or directly through an input/output device connected to the system. The present invention is directed to an information display system. An information display system for scheduling the utilization of a facility, comprising a controller connected to a display and a network interface.

A method for scheduling the utilization of a facility is also disclosed. The method comprises displaying scheduling information, controlling the information on the display, and interfacing the controller with a network interface for coupling the information display system to a network to a remote device.

A system for coordinating and displaying information regarding the utilization of a facility is also disclosed. The system comprising a server and an information display system connected to the server. The information display system comprising a display for displaying information a controller for controlling said display a network interface, coupled to said controller, for coupling the information display system to a network to a remote device and wherein the display is disposed proximal to the facility such that scheduling information for the facility transmitted from the remote device over the network to the information display system is capable of being displayed on the display.

22 Claims, 6 Drawing Sheets

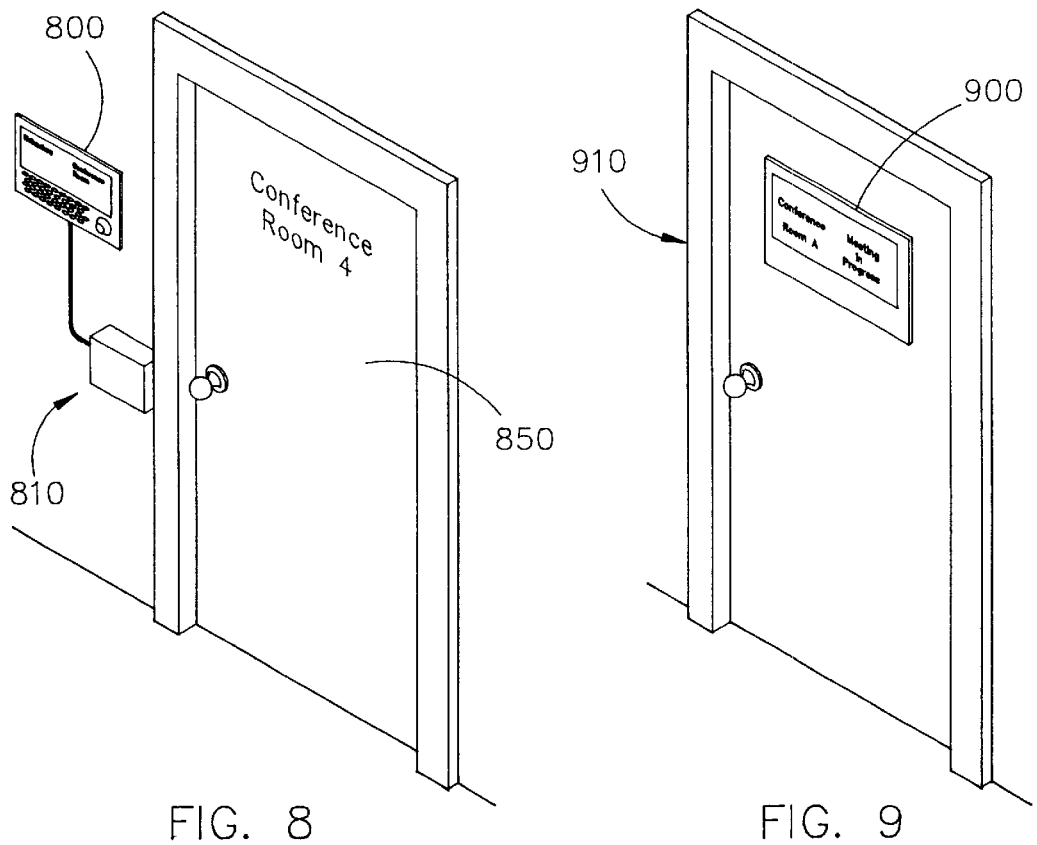
FIG. 8
FIG. 9
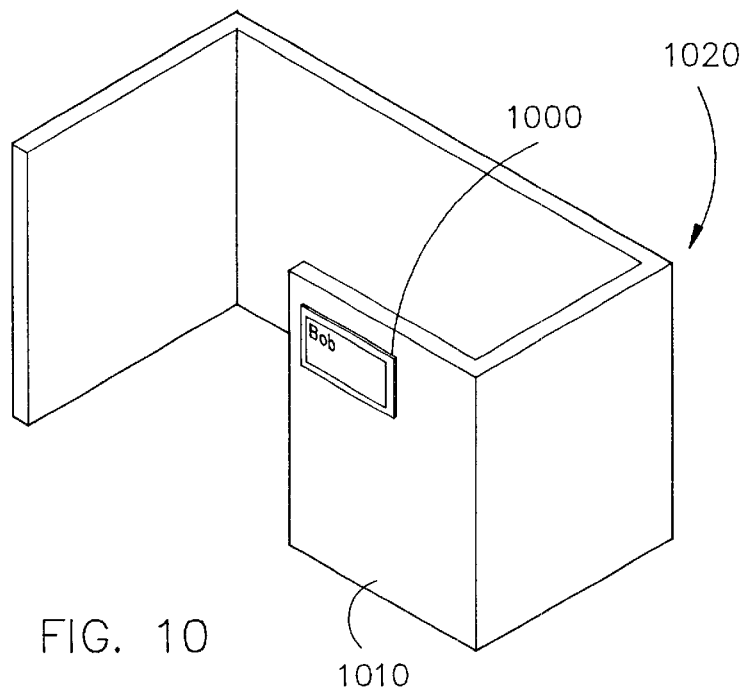
FIG. 10

INFORMATION DISPLAY SYSTEM FOR SCHEDULING THE UTILIZATION OF A FACILITY

FIELD OF THE INVENTION

The present invention generally relates to information handling systems, and particularly to networked information display systems.

BACKGROUND OF THE INVENTION

Rooms go unused even when they are set aside in a schedule. Previous methods of using written schedules and sign-up sheets to manage room usage are difficult to keep updated, due mainly to the inconvenience of changing the entry in a room log, or informing the person in charge of that room. Other types of information management systems, such as personal digital assistants, are not suitable for this use. These systems tend to be small, overly complicated, expensive to manufacture, and not able to manage information derived from a wide variety of sources to form a comprehensive system. It would be highly useful to present information regarding room usage in the place where it is needed most, at the entrance to the room. For example, by using a display as a door plate and connecting the display to a network interface so that the information display system may communicate over a network, important usage and scheduling information may be presented near the room. The network connection allows the schedule to be changed easily by anyone with access to the network, or at the door plate itself through an input/output device. The network connection also allows the system to incorporate information from a wide range of sources. Schedules regarding the use of conference rooms, patient information in doctor's offices, and the personal schedules of office occupants may be easily updated. Presenting this information on or near a door to the room would help to avoid the needless interruptions caused by people looking for a particular meeting or to check if that room is actually being used. In companies where it is necessary to share an office, or there is great movement between offices, the information display system may efficiently manage the office space. By using the information display system over a network, the name on the system may be changed easily, quickly, and more efficiently. There are times when vital information must be disseminated widely and quickly. By utilizing this invention, emergency information and other announcements may also be displayed on the information display system through the network interface. Name and title changes may also be updated and displayed through the system. For the foregoing reasons, there is a need for an information display system that may be located near an entryway, and that contains scheduling information that may be easily updated through a network interface.

SUMMARY OF THE INVENTION

The present invention is directed to an information display system. An information display system for scheduling the utilization of a facility, comprising a controller connected to a display and a network interface.

The present invention is further directed to a method for scheduling the utilization of a facility. The method comprises displaying scheduling information, controlling the information on the display, and interfacing the controller with a network interface for coupling the information display system to a network to a remote device.

The present invention is further directed to a system for coordinating and displaying information regarding the utilization of a facility, comprising a server and an information display system connected to the server. The information display system comprising a display for displaying information a controller for controlling said display a network interface, coupled to said controller, for coupling the information display system to a network to a remote device and wherein the display is disposed proximal to the facility such that scheduling information for the facility transmitted from the remote device over the network to the information display system is capable of being displayed on the display.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 8 is a drawing of the placement of an information display system, connected to a locking mechanism, near an entryway;

FIG. 9 is a drawing of an information display system attached to a door;

FIG. 10 is a drawing of an information display system attached to a cubicle.

DETAILED DESCRIPTION OF THE INVENTION

Reference will now be made in detail to the presently preferred embodiment of the invention, an example of which is illustrated in the accompanying drawings.

Figure 1:
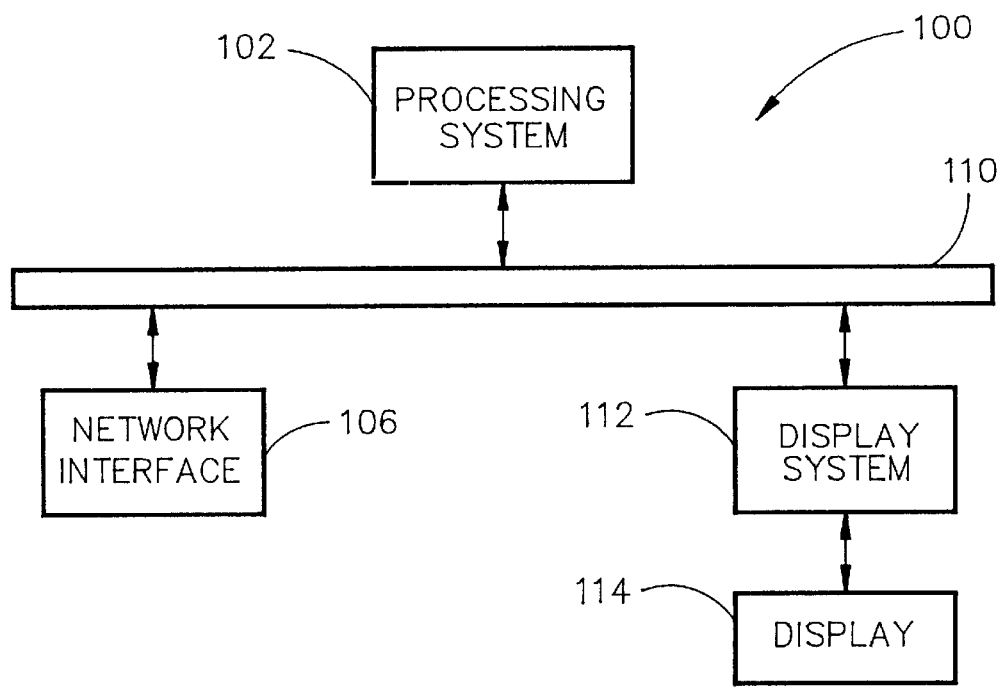
FIGS. 1 and 2 are block diagrams illustrating an information display system in accordance with the present invention.

Referring now to FIG. 1, a hardware system in accordance with the present invention is shown. The hardware system shown in FIG. 1 is generally representative of the hardware architecture of an information display system of the present invention. A controller, for example, a processing system 102, controls the information display system 100. The processing system 102 includes a central processing unit such as a microprocessor or microcontroller for executing programs, performing data manipulations and controlling the tasks of the information display system 100. Communication with the processing system 102 may be implemented through a system bus 110 for transferring information among the components of the information display system 100. The system bus 110 may include a data channel for facilitating information transfer between storage and other peripheral components of the information display system 100. The system bus 110 further provides the set of signals required for communication with processing system 102 including a data bus, address bus, and control bus. The system bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, the system bus 110 may be compliant with any promulgated industry standard. For example, the system bus 110 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394, Apple Desktop Bus (ADB), Concentration Highway Interface (CHI), Fire Wire, Geo Port, or Small Computer Systems Interface (SCSI), for example.

The information display system 100 further includes a display system 112 for connecting to a display device 114. The display system 112 may comprise a video display adapter having all of the components for driving the display device, including video random access memory (VRAM), buffer, and graphics engine as desired. The display device 114 may comprise a liquid-crystal display (LCD), or may comprise alternative type of display technologies, such as, a cathode-ray tube (CRT) type display such as a monitor or television, a light-emitting diode (LED) display, gas or plasma display, or employ flat-screen technology.

The information display system 100 further includes a network interface 106. The network interface 106 communicates between the information display system 100 and a remote device, such as external devices, networks, information sources, or host systems that administer a plurality of information display systems. For example, host systems such as a server, may run software controlling the information display systems, serve as a storage for the information display systems, or coordinate software running separately on each information display system. The network interface 106 may provide or receive analog, digital, or radio frequency. The network interface system 106 preferably implements industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Universal Serial Bus (USB), and so on. For example, the network interface system 106 may comprise a network adapter, a serial port, parallel port, printer adapter, modem, universal asynchronous receiver-transmitter (UART) port, etc., or use various wireless technologies or links such as an infrared port, radio-frequency (RF) communications adapter, infrared transducers, or RF modem.

Figure 2:
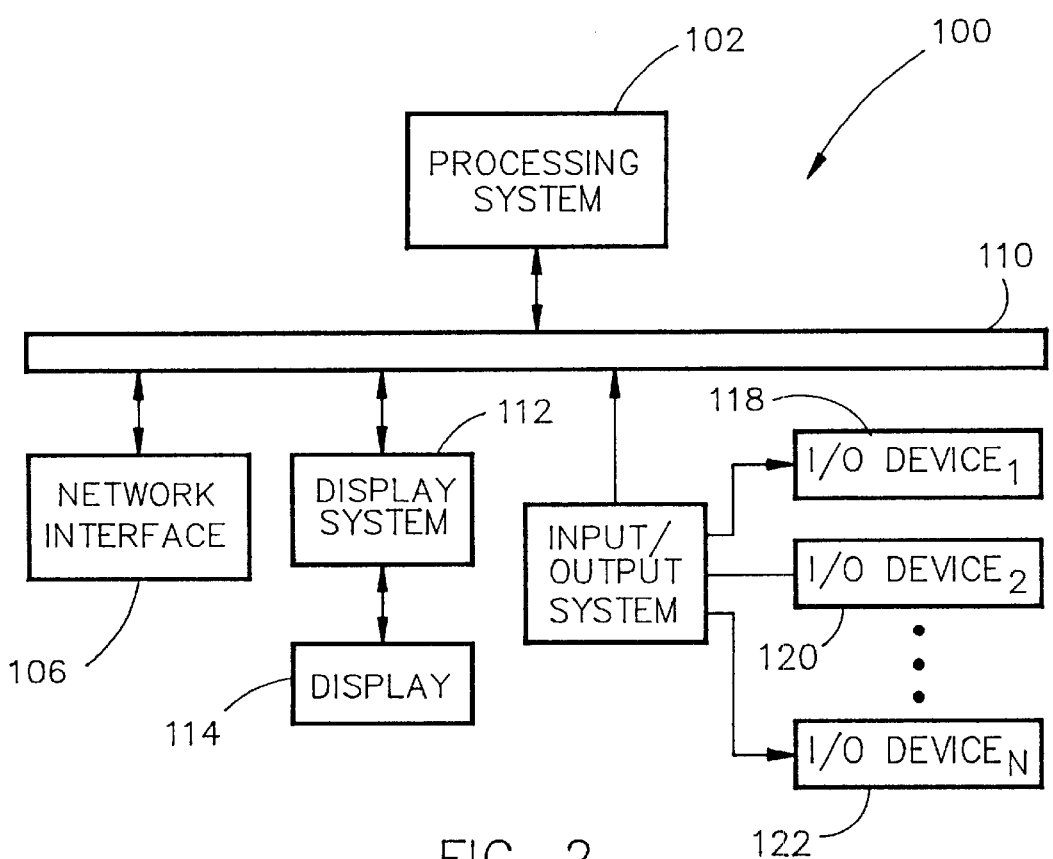

Referring now to FIG. 2, an information display system 100 may further include an input/output (I/O) system 116 for connecting to one or more I/O devices 118, 120 up to N number of I/O devices 122, as shown in FIG. 2. Input/output system 116 may comprise one or more controllers or adapters for providing interface functions between one or more of I/O devices 118–122. For example, input/output system 116 may comprise a serial port, parallel port, network adapter, printer adapter, radio-frequency (RF) communications adapter, universal asynchronous receiver-transmitter (UART) port, etc., for interfacing between corresponding I/O devices such as a door locking mechanism, door sensor to detect movement of a door, photo diode, sound detector, motion detector, thermostat, mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. It should be appreciated that modification or reconfiguration of the information display system 100 of FIGS. 1 and 2 by one having ordinary skill in the art would not depart from the scope or the spirit of the present invention.

Figure 3A:
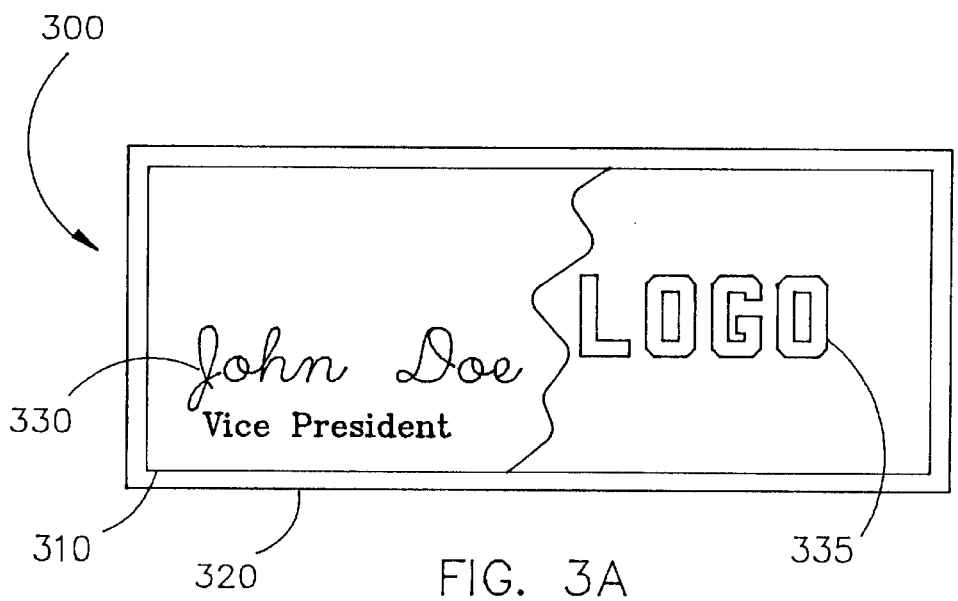
FIGS. 3A, 3B, and 3C are drawings of an information display system.
Figure 3B:
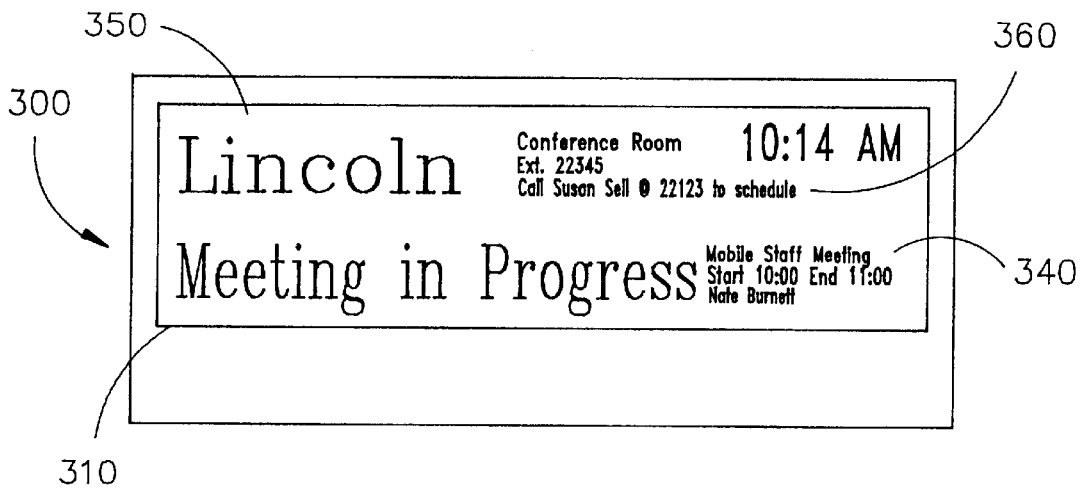
Figure 3C:
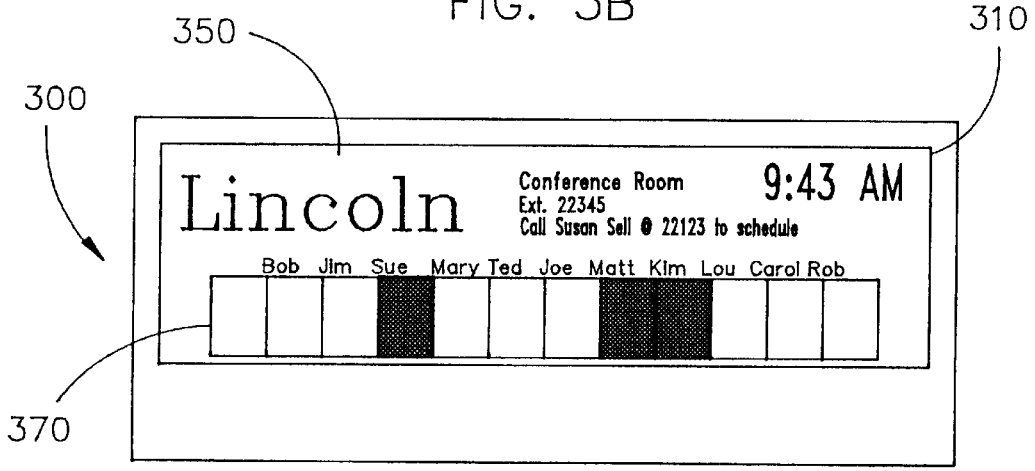

Referring now to FIG. 3A, 3B, and 3C, exemplary embodiments of information display systems comprise a LCD screen 310, contained in a housing 320 with a processing system 102 and network interface 106 positioned inside of the information display system (FIGS. 1 & 2). The LCD screen 310 is capable of presenting information processed by the controller to manage the room's usage. A person utilizing a remote device (for example, a computer) connected to the information display system through the network interface 106 may update or query the room's usage (FIGS. 1 & 2). The device may be connected through a server so that the device may be accessed over existing networks. In a preferred embodiment of the present invention, the display 310 may be a monochrome LCD with no back-lighting. Use of ambient light may be all that is necessary for the display and give the information display system low power requirements. Power requirements may be low enough so that the information display system may be powered, for example, by a powered network connection, onboard battery, solar cell, etc.

In FIG. 3A, an exemplary embodiment of the present invention is shown. In this embodiment, the information display system 300 is configured to be placed outside of an office. Information, in this instance the name of an office occupant 330, is displayed on the screen 310. The name of the occupant 330 may be changed through a network interface 106 (FIGS. 1 & 2). Graphic indicia may also be displayed by the information display system. In this example, the information display system is capable of switching between the name and title of an office occupant 330 to a graphic of a company logo 335 in a predetermined amount of time. Other examples, which include but are not limited to a company logo, a personalized screen saver, picture of the office occupant, art works, etc. may also be displayed on the screen 310 entered by either the administrator of the system or the office occupant. The time of day may also be displayed on the screen 310. Furthermore, symbols may be displayed on the screen 310 indicating room usage. Any device contained in the room, such as video conferencing equipment, telephone conferencing equipment, overhead projectors, etc., may be monitored by the information display system, and resultant usage displayed accordingly. For example, if the lights of the room were on, detected by a photo diode or direct connection to the room lighting system, a lightbulb may be displayed on the screen. In another example, video conferencing equipment may be connected to the information display system so that when in use, the system displays that a video conferencing session is progressing. In this way, interruptions may be minimized. Additionally, motion and sound detectors may also be utilized so that room usage may be determined. The information display system may then display a message indicating the room usage, in this instance, that the room is occupied. By connection through the network interface, the usage of a large number of rooms may be monitored, for example, for security purposes, or to better manage the facility.

Referring now to FIG. 3B, a second exemplary embodiment of the present invention is shown. In this embodiment, an information display system 300 is configured to be used near an entryway to a conference room. Time management software is utilized by the information display system to process information regarding the rooms usage and present this information on the display 310. Various types of information may be displayed, including the name of the group reserving the room 340, the name of the room 350, and contact information 360. Information may be updated through a network interface 106 (FIGS. 1 & 2). In FIG. 3C, the information display system may provide a schedule 370 displayed on the screen 310 showing when the room 350 is reserved. In this example, the information display system 300 may display details of the next scheduled meeting. Various types of software may be utilized by the system. Preferred types of scheduling software include but are not limited to Microsoft® Outlook™, Microsoft®Schedule+™, and Lotus® Organizer.

Figure 4:
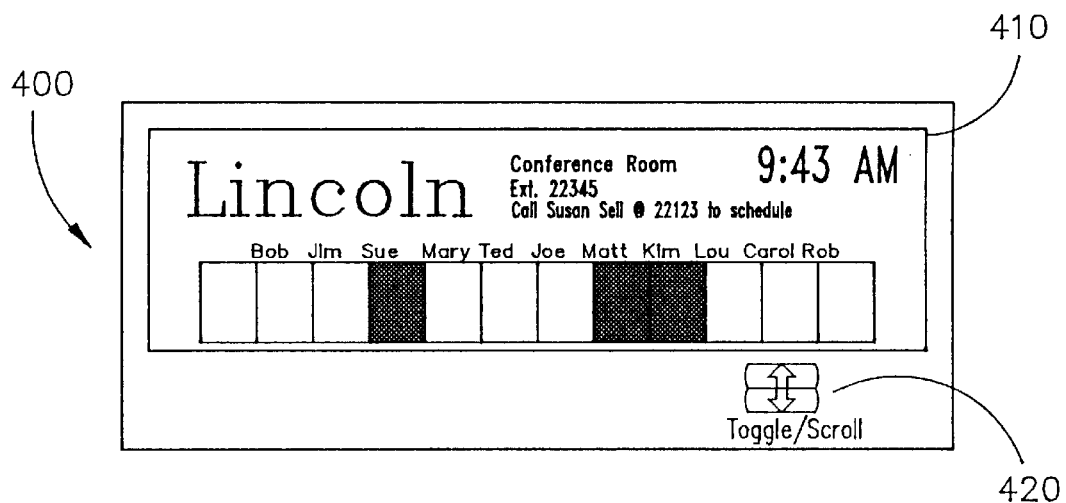
FIG. 4 is a drawings of an information display system wherein a control is placed on the information display system.
Figure 5:
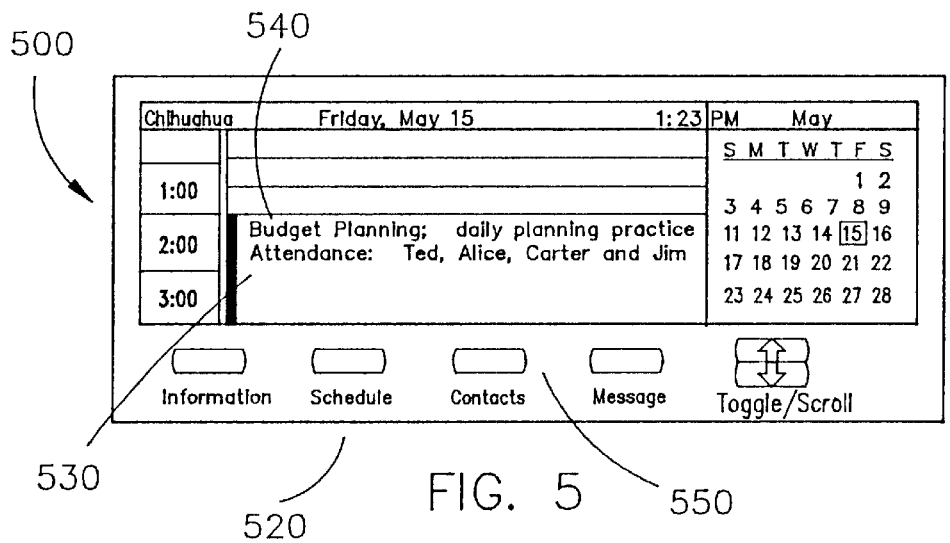
FIG. 5 is a drawings of an information display system wherein a plurality of controls are disposed on the information display system.
Figure 6:
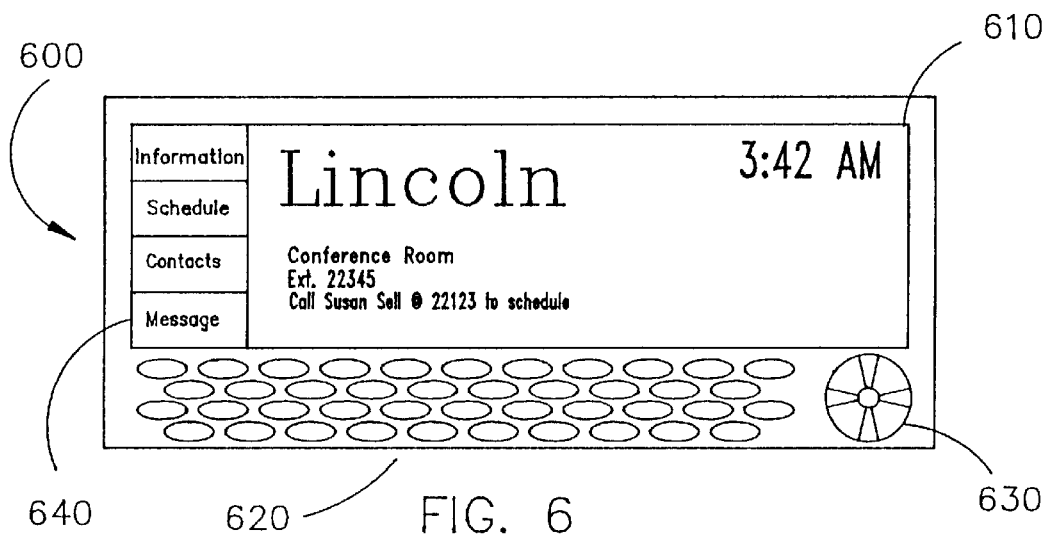
FIG. 6 is a drawings of an information display system wherein a keypad and cursor control device are connected to the information display system.

Referring now to FIGS. 4–6, information may also be controlled and entered directly through the information display system. In FIG. 4, the information display system 400 includes one or more controls 420 as an input/output device to navigate through the information on the screen 410. In FIG. 5, the information display system contains a plurality of controls 520 to access information contained in the information display system 500. This information may include who reserved the room 530, for what purpose the room is reserved 540, and who to contact 550 if questions arise regarding the reservation. Controls 520 used to access the information may include, for example, a joystick, trackball, track-pad, track-stick, scanner, touch screen, stylus, microphone, speaker, etc. Hot keys may be mapped to various display screens, as shown in FIGS. 3A, 3B, and 7 to access information contained in the unit or access other types of information contained in various devices connected through the network interface 106 (FIGS. 1 and 2).

Referring now to FIG. 6, the information display system contains a keypad 620 to enter information into the information display system 600. In this exemplary embodiment, the information display system utilizes messaging software to process, retain, and display messages on the display 610. For example, the messages may be entered on a computer through a network connected to the information display system by utilizing the network interface 106 (FIGS. 1 & 2), or through a keypad 620, cursor control device 630, or any other input device, such as a touch screen or voice recognition system. For example, if the information display system 600 was placed outside an office, visitors may access the message feature 640 through the keypad 620 or cursor control device 630 on the information display system 600 to leave a message for the occupant. Or, if the information display system 600 is placed outside a conference room, the room may be reserved by using an input/output device connected to the information display system utilizing time management software. Additionally, an individual may leave a phone message for a conference attendee. The phone message may be entered into the information display system 600, for example, automatically through a voice mail system or a system operator.

Figure 7:
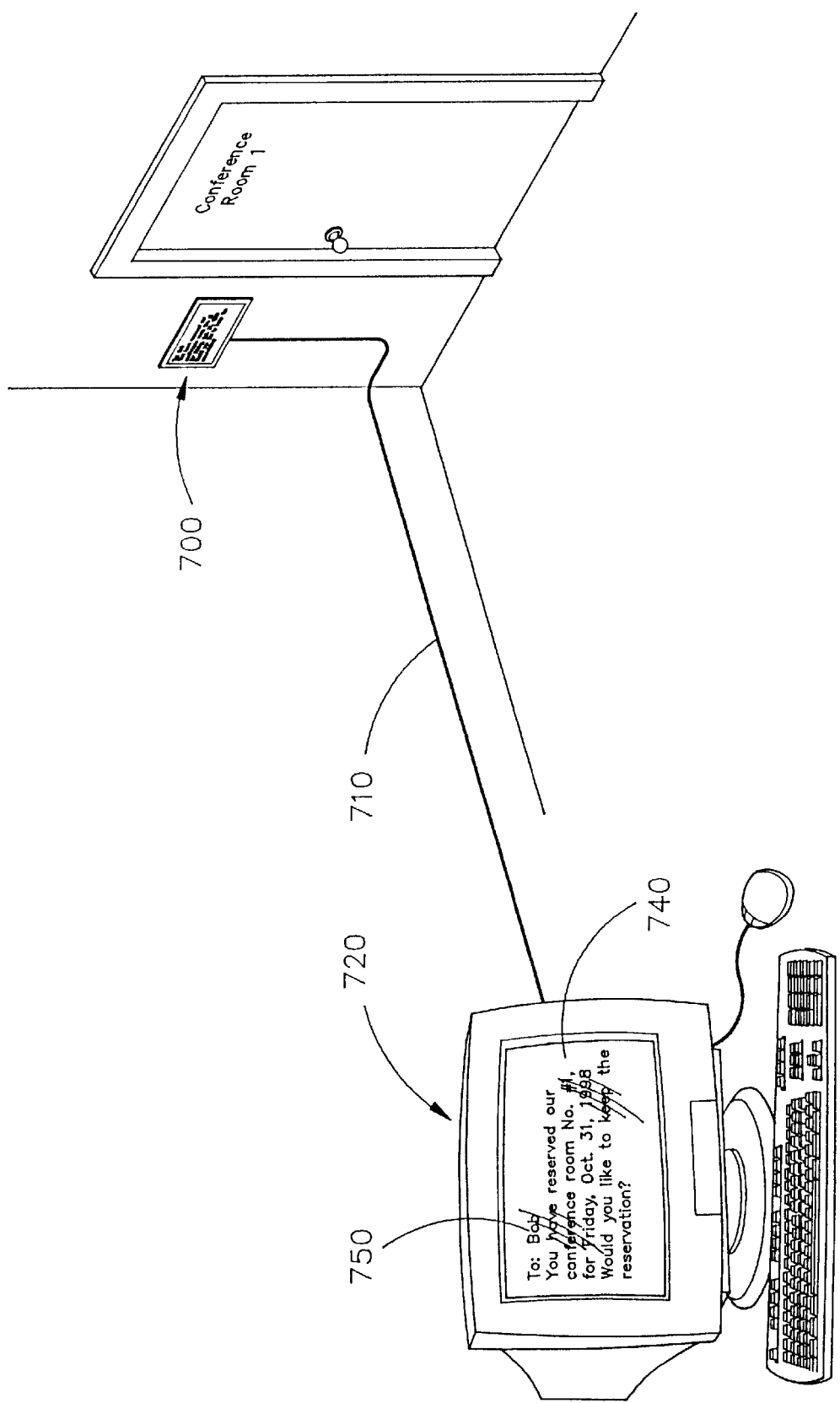
FIG. 7 is a diagram of an information display system capable of sending a reminder message.

Referring now to FIG. 7, an exemplary embodiment of the present invention is shown. In this embodiment, the information display system 700 utilizes messaging software to send a reminder message 740 or a series of reminder messages through the network 710 to the computer 720 of the person who reserved the room 750. For example, this message may ask whether the person will keep the reservation or if the reservation should be deleted. Another type of message may serve as a reminder for a group of people to attend a meeting. For example, a list of names of all the people scheduled for a meeting may be entered into the unit, either directly or through a network, so that reminders are sent to the people on that list. These reminders may be sent as e-mail or any other type of message through the network connection. This embodiment increases room usage efficiency by verifying the schedule for the room.

Referring now to FIG. 8, an information display system 800 that includes a locking mechanism 810 is shown. The information display system 800 utilizes security software to control a lock mechanism 810 so as to allow access to the room at different prescheduled times, or to require a password, pass card, personal identification number, or other method of identification to gain access through the door 850. Different periods of access may be controlled by the information display system 800. For example, the information display system may restrict access to the room between certain hours, and lock the room at all other times to keep the room secure. The use of different codes linked to prescheduled times on the system would allow only certain people access to the room at specific times. For instance, instead of allowing general access between midnight and dawn, the information display system may be configured to allow only persons with a certain code to enter the room in that time period, such as cleaning personnel. Alternatively, the information display system may include a door sensor, so that entry into the room may be sensed. For example, when the information display system determines that a door is opened, the system may notify security, turn on the lights, start a computer, or perform any other action desired by the office occupant. These actions may be linked to scheduling software, so that the lights come on between certain hours. For example, the controller, sensing that someone has entered the room at 6:00 am, turns on the lights, but will not turn on the lights when someone enters the room at noon. This increases the room's safety by freeing people that enter the room from having to reach for light switches. It is also possible to connect a radio frequency 1S []identification reader for reading and identifying radio frequency transponders. For example, the information display system could detect a radio frequency identification transponder located on an employees badge. When the employee enters a conference room, the information display system may access the personal schedule for the employee through the network connection 106 (FIGS. 1 and 2) based on the identification tag so that the personal schedule of that employee may be displayed on the screen. This allows people trying to contact the employee to determine when he is next available. The door plate may also limit access to the room based on the radio frequency transponders contained in the employee badge.

There are many possible locations for the information display system. For example, in FIG. 8, the information display system 800 may be mounted next to a door 850. In FIG. 9, the information display system 900 may be mounted on the door 910 itself. The information display system may utilize wireless technology (not shown) to communicate with a host system, central computer, etc. The information display system 1000 may also be mounted on the wall 1010 of a cubicle 1020, as in FIG. 10. There are many advantages to mounting the display on a cubicle. One advantage is that in many companies people change cubicles often, making it difficult to keep the name on the cubicle updated. This makes it difficult for both the person using the cubicle to find his new location and for people trying to find him. By using the information display system over a network, the name on the system may be changed easily, quickly, and more efficiently. The information display system may utilize a wireless connection, such as a radio frequency connection, so as to eliminate the need for extra wiring, which is especially important involving cubicles that tend to be reconfigured often. The information display system may also utilize mapping software so that a map displaying the names of the occupants is generated, and may be displayed on each information display system or computer connected to the network.

Figure 11:
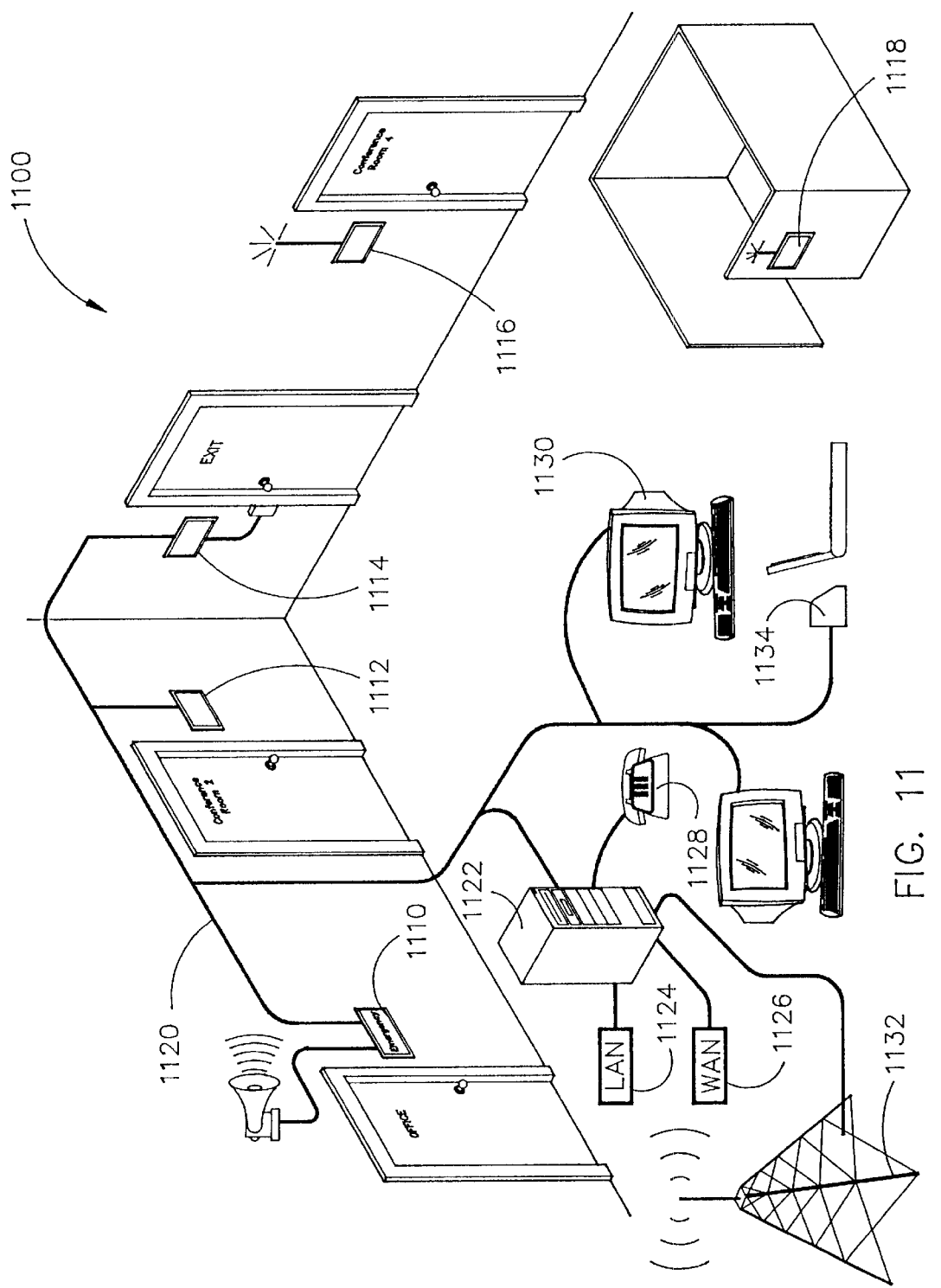
FIG. 11 is a diagram of connections to a networked information display system.

Referring now to FIG. 11, a network of information display systems 1100 is shown. A plurality of information display systems 1110 may be connected to a network 1120. Each information display system may be accessed individually or as a group over the network 1120 through remote devices, such as computers 1130, docking stations 1134, local area networks 1124, wide area networks 1126, and remote phone access connections 1128 connected to the network 1120 through a server 1122. The server 1122 may serve as a host system, for example, to run software controlling the information display systems, serve as a storage for the information display systems, or coordinate software running separately on each information display system, or coordinate information obtained from a wide variety of different networks, systems, or mechanisms. The information display system may operate in a distributed computing network wherein each information display system may handle its own workload. In contrast to a client/server architecture, a network may be implemented utilizing a "distributed computing" architecture. In a distributed computing architecture, a system of information display systems may be connected together for communicating. Each information handling system handles its local workload, and the network supports the system as a whole. The information display system may further utilize advanced wireless technologies 1132 to communicate with a central computer, host data terminal, or the like in an interactive or on-line mode via a data communications link established by a radio frequency (RF) transceiver assembly or radio. For example, the information display system may employ such radios as an internal 2.4 Gigahertz (GHz) RF radio (e.g., a Proxim radio) for communication with a 2.4 GHz local area network (LAN) system, an internal cellular digital packet data (CDPD) radio modem for communication with a cellular telephone system, an internal 400 MHz or 900 MHz radio (e.g., RAM radio) for communication with a 400 MHz or 900 MHz Wide Area Network (WAN) data system (e.g., US Mobitex), an internal 800 MHz radio (e.g., Ardis) for communication with a US Motorola Wide Area Network data system, or an internal 900 MHz radio (Motorola) for communication with a 900 MHz private radio network data system, one way paging radio, two way paging radio, GSM (global system for mobile communication) radio, or the like.

The network interface of the information display system enables people connected to the network to access the information contained in the information display system 1100. For example, an office worker connected to the network could determine if a room is reserved, when it is reserved, and reserve a room if necessary. If an office worker no longer needs a room or needs to change his schedule, the information may be changed easily over the network. Emergency information 1110 may also be displayed through the network. This information may include the type of emergency and suggested routes for exit. Various types of entrances and rooms may be managed by using this system. For instance, the system may control access through an exit 1114 by utilizing a locking mechanism, the room usage of a conference room 1112, the personal schedule of the occupant of a cubicle 1118, etc. These various systems may be integrated, so that a wireless connection to a room 1118, emergency information 1110, and schedules may all be coordinated.

Although the invention has been described with a certain degree of particularity, it should be recognized that elements thereof may be altered by persons skilled in the art without departing from the spirit and scope of the invention. It is believed that the means and apparatus for an information display system of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An information display system for scheduling the utilization of a facility, comprising:
   a display for displaying information;
   a controller for controlling said display;
   a network interface, coupled to said controller, for coupling the information display system to a network to a remote device; and
   wherein the information display system is disposed proximal to the facility such that scheduling information for the facility transmitted from the remote device over the network to the information display system is capable of being displayed on the display, the information display system controlling access to the facility based upon the scheduling information.

2. The information display system as described in claim 1, the information display system capable of receiving messages.

3. The information display system as described in claim 1, the information display system capable of sending information over the network.

4. The information display system as described in claim 1, further comprising an input/output device coupled to said controller for entering information into the information display system.

5. The information display system as described in claim 4, wherein the input/output device comprises a cursor control device.

6. The information display system as described in claim 4, wherein the input/output device comprises a touch-screen.

7. The information display system as described in claim 4, wherein the input/output device comprises a device to detect room usage.

8. The information display system as described in claim 1, wherein the network interface being adapted to communicate over a wireless network.

9. The information display system as described in claim 1, wherein the display device comprises a liquid-crystal display.

10. The information display system as described in claim 1, receiving power via the network.

11. The information display system as described in claim 1, the information display system being adapted to display on said display emergency situation information transmitted from the remote device to the information display system over the network.

12. An information display system for scheduling the utilization of a facility, comprising:
- means for displaying information;
- means for controlling said display means;
- means for networking, coupled to said controller means, for coupling the information display system to a network to a remote device;
- means for controlling access to the facility; and
- wherein the information display system is disposed proximal to the facility such that scheduling information for the facility transmitted from the remote device over the network means to the information display system is capable of being displayed on the display means.

13. The information display system of claim 12, further comprising a means for inputting/outputting information coupled to the controlling means.

14. The information display system as descried in claim 13 wherein the input/output means comprises a cursor control.

15. The information display system as described in claim 13 wherein the input/output means comprises a touch-screen.

16. The information display system as described in claim 13, wherein the input/output means comprises a means to detect room usage.

17. The information display system as described in claim 12, wherein the network means being adapted to communicate over a wireless network.

18. The information display system as described in claim 12 wherein the display means comprises a liquid-crystal display.

19. The information display system as described in claim 12 wherein the access means controlling access to the facility is based upon the scheduling information.

20. An information display system for scheduling the utilization of a facility, comprising:
- a housing,
- a display for displaying information, the display disposed on said housing so as to be viewable by a user;
- a controller for controlling said display, the controller disposed in said housing; and
- a network interface, coupled to said controller, for coupling the information display system to a network to a remote device;
- wherein the information display system is disposed proximal to the facility such that scheduling information for the facility to which the information display system is disposed proximally to is transmitted from the remote device over the network to the information display system and is capable of being displayed on the display, the information display system controlling access to the facility based upon the scheduling information.

21. The information display system as described in claim 20, further comprising an input/output device coupled to said controller for entering information into the information display system.

22. The information display system as described in claim 21, wherein the input/output device comprises a device to detect room usage.

* * * * *